United States Patent
Rink et al.

(10) Patent No.: US 6,289,814 B1
(45) Date of Patent: *Sep. 18, 2001

(54) HEAT SOURCE FOR AIRBAG INFLATION GAS GENERATION VIA A DISSOCIATING MATERIAL

(75) Inventors: Karl K. Rink, Liberty; David J. Green, Brigham City; Bradley D. Harris, Farmington, all of UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/112,838

(22) Filed: Jul. 10, 1998

Related U.S. Application Data

(63) Continuation-in-part of application No. 09/027,020, filed on Feb. 20, 1998, now Pat. No. 6,117,254, and application No. 09/005,274, filed on Jan. 9, 1998, and application No. 08/935,014, filed on Sep. 22, 1997, now Pat. No. 5,941,562, and application No. 08/935,016, filed on Sep. 22, 1997, now Pat. No. 5,884,938, which is a continuation-in-part of application No. 08/632,698, filed on Apr. 15, 1996, now Pat. No. 5,669,629.

(51) Int. Cl.$^7$ ........................................ C06D 5/06
(52) U.S. Cl. ........................................ 102/288; 102/289
(58) Field of Search ........................................ 102/288, 289

(56) References Cited

U.S. PATENT DOCUMENTS

| | | | |
|---|---|---|---|
| 273,209 | 2/1883 | Wiard | 280/741 |
| 651,132 | 6/1900 | Davis | 280/741 |
| 1,056,560 | 3/1913 | Lippincott | 280/741 |
| 1,805,721 | 5/1931 | Kogl | 280/741 |
| 2,334,211 | 11/1943 | Miller | 280/741 |
| 2,403,932 | 7/1946 | Lawson | 252/186 |
| 2,995,987 | 8/1961 | Fitzpatrick | 89/7 |
| 3,109,374 | 11/1963 | Rumbel et al. | 102/98 |
| 3,664,134 | 5/1972 | Seitz | 60/274 |
| 3,862,866 | 1/1975 | Timmerman et al. | 149/21 |
| 3,884,497 | 5/1975 | Massengill et al. | 280/741 |
| 3,898,048 | 8/1975 | Barber et al. | 280/731 |
| 3,931,374 | * 1/1976 | Moutet nee Layrisse | 149/114 |
| 3,958,949 | 5/1976 | Plantif et al. | 23/281 |
| 3,964,256 | 6/1976 | Plantif et al. | 60/219 |
| 3,985,375 | 10/1976 | Lewis et al. | 280/737 |
| 3,986,456 | 10/1976 | Doin et al. | 102/239 |
| 4,050,483 | 9/1977 | Bishop | 280/741 |
| 4,291,533 | * 9/1981 | Dugger et al. | 102/374 |
| 4,358,998 | 11/1982 | Schneiter et al. | 280/741 |
| 4,798,142 | 1/1989 | Canterberry et al. | 102/290 |
| 4,896,898 | 1/1990 | Lenzen et al. | 280/737 |
| 4,994,125 | 2/1991 | Mei | 149/22 |

(List continued on next page.)

FOREIGN PATENT DOCUMENTS

| | | |
|---|---|---|
| 43 03169 | 4/1994 | (DE) . |
| 07 57975 | 2/1997 | (EP) . |
| 2111442 | 6/1972 | (FR) . |

OTHER PUBLICATIONS

*Radioflo Theory Training Manual*, 1/97 by Iso Vac Engineering, Inc., pp. T–1 through T–27.

"Leak Testing Electronic Devices in Production Quantities" by George Neff and Jimmie Neff reprint from *Microelectronic Manufacturing and Testing*, Sep. 1986.

Patent Abstract of Japan, vol. 005, No. 156 (C–074), Oct. 6, 1981 & JP 56 088804 A (Toshiba Battery Co. Ltd.), Jul. 18, 1981.

*Primary Examiner*—Peter A. Nelson
(74) *Attorney, Agent, or Firm*—Sally J. Brown; James D. Erickson

(57) ABSTRACT

An apparatus and method for inflating an inflatable device which involve a heat source composed of a load of fuel material and an initiator is actuatable to be in heat transmitting communication such as to initiate dissociation of a gas source material to form at least one gaseous dissociation product used to inflate the inflatable device.

34 Claims, 10 Drawing Sheets

U.S. PATENT DOCUMENTS

| | | | |
|---|---|---|---|
| 4,998,751 | 3/1991 | Paxton et al. | 280/741 |
| 5,002,308 | 3/1991 | Lenzen et al. | 280/741 |
| 5,024,160 | 6/1991 | Canterberry et al. | 102/323 |
| 5,031,932 | 7/1991 | Frantom et al. | 102/289 |
| 5,060,973 | 10/1991 | Giovanetti | 280/736 |
| 5,066,039 | 11/1991 | Shitanoki et al. | 280/741 |
| 5,076,607 | 12/1991 | Woods et al. | 149/35 |
| 5,101,730 | 4/1992 | Bender et al. | 102/288 |
| 5,171,385 | 12/1992 | Michels et al. | 149/19.1 |
| 5,230,287 | 7/1993 | Arrell, Jr. et al. | 102/202.5 |
| 5,230,531 | 7/1993 | Hamilton et al. | 280/741 |
| 5,230,532 | 7/1993 | Blumenthal et al. | 102/289 |
| 5,263,740 | 11/1993 | Frey et al. | 280/740 |
| 5,320,692 * | 6/1994 | Burdette et al. | 149/87 X |
| 5,330,730 | 7/1994 | Brede et al. | 422/305 |
| 5,348,344 | 9/1994 | Blumenthal et al. | 280/741 |
| 5,403,036 | 4/1995 | Zakula et al. | 280/741 |
| 5,404,813 | 4/1995 | Wong | 280/741 |
| 5,411,290 | 5/1995 | Chan et al. | 280/741 |
| 5,428,988 | 7/1995 | Starkovich | 73/40 |
| 5,429,691 | 7/1995 | Hinshaw et al. | 149/35 |
| 5,439,537 | 8/1995 | Hinshaw et al. | 149/35 |
| 5,452,661 | 9/1995 | Neff | 280/741 |
| 5,464,248 | 11/1995 | Sasaki et al. | 280/741 |
| 5,467,714 * | 11/1995 | Lund et al. | 102/288 X |
| 5,470,104 | 11/1995 | Smith et al. | 280/737 |
| 5,483,896 | 1/1996 | Hock et al. | 280/741 |
| 5,494,312 | 2/1996 | Rink | 280/737 |
| 5,504,288 | 4/1996 | Morin | 280/736 |
| 5,518,268 | 5/1996 | Moore et al. | 280/737 |
| 5,531,473 * | 7/1996 | Rink et al. | 149/85 X |
| 5,536,339 | 7/1996 | Verneker | 149/19.5 |
| 5,580,086 | 12/1996 | McAlister | 280/741 |
| 5,582,806 | 12/1996 | Skanberg et al. | 149/19.1 |
| 5,620,205 | 4/1997 | Lauritzen et al. | 102/288 |
| 5,623,115 | 4/1997 | Lauritzen et al. | 280/741 |
| 5,649,720 | 7/1997 | Rink et al. | 280/737 |
| 5,655,790 | 8/1997 | Faigle et al. | 280/741 |
| 5,668,345 | 9/1997 | Schroeder et al. | 102/289 |
| 5,669,629 | 9/1997 | Rink | 280/741 |
| 5,672,843 | 9/1997 | Evans et al. | 102/289 |
| 5,678,857 | 10/1997 | Johnson et al. | 280/741 |
| 5,713,595 | 2/1998 | Mooney et al. | 280/736 |
| 5,756,924 * | 5/1998 | Early et al. | 102/201 |
| 5,763,817 * | 6/1998 | Renfroe et al. | 102/289 X |
| 5,786,543 * | 7/1998 | Staudhammer et al. | 102/289 X |
| 5,806,885 | 9/1998 | Hock | 280/737 |
| 5,821,448 * | 10/1998 | Hamilton et al. | 102/289 X |
| 5,884,938 | 3/1999 | Rink et al. | 280/741 |
| 5,924,728 | 7/1999 | Evans et al. | 280/741 |
| 5,931,495 | 8/1999 | Rink et al. | 280/737 |

* cited by examiner

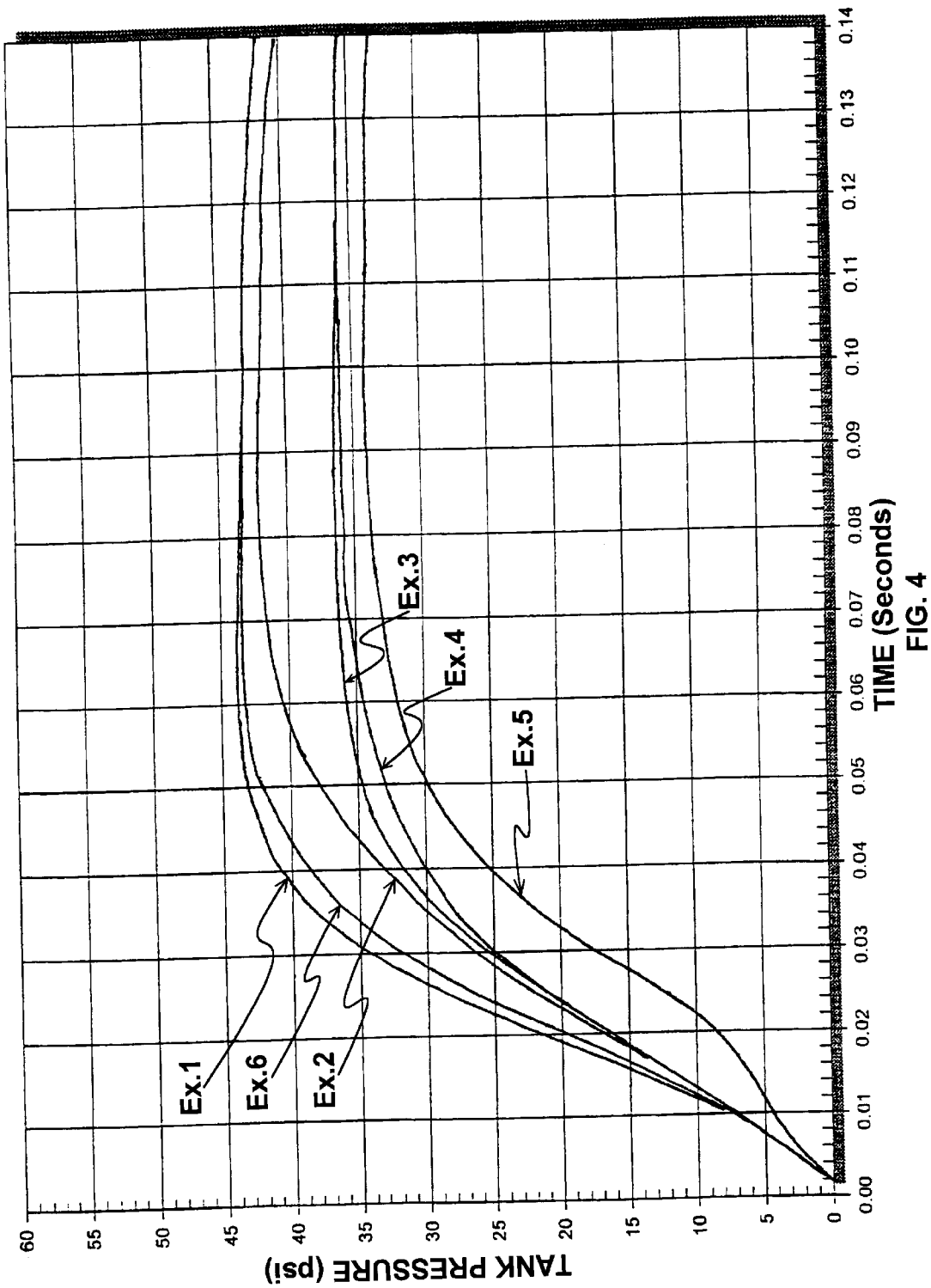

HEAT SOURCE FOR AIRBAG INFLATION GAS GENERATION VIA A DISSOCIATING MATERIAL

CROSS REFERENCE TO RELATED APPLICATIONS

This application is a continuation-in-part application of prior U.S. patent applications, U.S. Ser. No. 09/027,020 filed on Feb. 20, 1998, now U.S. Pat. No. 6,117,254 U.S. Ser. No. 09/005,274, filed on Jan. 9, 1998, and U.S. Ser. Nos. 08/935,014 U.S. Pat. No. 5,941,562 and 08/935,016, U.S. Pat. No. 5,884,938 each respectively filed on Sep. 22, 1997 as a continuation-in-part application of application U.S. Ser. No. 08/632,698, filed on Apr. 15, 1996, now Rink, U.S. Pat. No. 5,669,629, issued Sep. 23, 1997. The disclosures of each and every of these prior applications are hereby incorporated by reference herein and made a part hereof, including but not limited to those portions which specifically appear hereinafter.

BACKGROUND OF THE INVENTION

This invention relates generally to inflatable restraint systems and, more particularly, to an apparatus and method for inflating an inflatable device such as an inflatable vehicle occupant restraint for use in such systems.

It is well known to protect a vehicle occupant using a cushion or bag, e.g., an "airbag cushion," that is inflated or expanded with gas such as when the vehicle encounters sudden deceleration, such as in a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as "an inflator."

Many types of inflator devices have been disclosed in the art for the inflating of one or more inflatable restraint system airbag cushions. Prior art inflator devices include compressed stored gas inflators, pyrotechnic inflators and hybrid inflators. Unfortunately, each of these types of inflator devices has been subject to certain disadvantages such as greater than desired weight and space requirements, production of undesired or non-preferred combustion products in greater than desired amounts, and production or emission of gases at a greater than desired temperature, for example.

In view of these and other related or similar problems and shortcomings, a new type of inflator, called a "fluid fueled inflator," has been developed. Such inflators are the subject of commonly assigned Smith et al., U.S. Pat. No. 5,470,104, issued Nov. 28, 1995; Rink, U.S. Pat. No. 5,494,312, issued Feb. 27, 1996; and Rink et al., U.S. Pat. No. 5,531,473, issued Jul. 2, 1996, the disclosures of which are fully incorporated herein by reference.

Such inflator devices typically utilize a fuel material in the form of a fluid, e.g., in the form of a gas, liquid, finely divided solid, or one or more combinations thereof, in the formation of an inflation gas for an airbag. In one such inflator device, the fluid fuel material is burned to produce gas which contacts a quantity of stored pressurized gas to produce inflation gas for use in inflating a respective inflatable device.

While such an inflator can successfully overcome, at least in part, some of the problems commonly associated with the above-identified prior types of inflator devices, there is a continuing need and demand for further improvements in safety, simplicity, effectiveness, economy and reliability in the apparatus and techniques used for inflating an inflatable device such as an airbag cushion.

To that end, the above-identified Rink, U.S. Pat. No. 5,669,629 discloses a new type of inflator wherein a gas source material undergoes decomposition or dissociation to form products including at least one gaseous product used to inflate an inflatable device. As disclosed in Rink, U.S. Pat. No. 5,669,629, a pyrotechnic load-containing initiator device can be actuated to commence dissociation or decomposition of the gas source material.

Such an inflator can be helpful in one or more of the following respects: reduction or minimization of concerns regarding the handling of content materials; production of relatively low temperature, non-harmful inflation gases; reduction or minimization of size and space requirements and avoidance or minimization of the risks or dangers of the gas producing or forming materials undergoing degradation (thermal or otherwise) over time as the inflator awaits activation.

"Rise rate," i.e., the rate at which the gas output from an inflator increases pressure as measured when such gas output is directed into a closed volume, is a common vehicular airbag inflator performance parameter used in the design, selection and evaluation of an inflator for particular airbag restraint system installations. In general, the rise rate produced by each of the above-identified types or kinds of inflator devices is controlled, selected or otherwise predetermined by the area provided by or in the particular inflator device for inflation output flow.

While the rise rate produced or resulting from an inflator, such as described above and which inflator contains a gas source material which undergoes decomposition or dissociation to form products including at least one gaseous product used to inflate an inflatable device, can be controlled or selected based on the inflation output flow through area provided by the inflator, such reliance can in practice be problematic. For example, restrictions in the inflation output flow through area provided by an inflator can result in dramatic increases in pressure within the inflator upon the actuation thereof. As will be appreciated, proper inflator design will generally necessitate that the inflator design account for such pressure increases, such as by inflator fabrication using materials of higher strength or through the use of increased inflator wall thicknesses.

Further, the inflation output flow through areas of such inflators are commonly normally covered or obstructed such as by means of one or more burst discs or the like, until such time flow therethrough is actuated. Thus, inflators with increased inflation output flow through areas commonly require burst discs or the like of increased strength or thickness. As will be appreciated, such uses of materials of higher strength or of greater thickness generally have associated therewith increased costs.

In view of the above, there is a need and a demand for an apparatus and a method for inflating an inflatable device such as an inflatable vehicle occupant restraint for use in an inflatable restraint system which permits either or both the design and control of the rise rate resulting from an inflator device such as an inflator device which contains a gas source material which undergoes decomposition or dissociation to form products, including at least one gaseous product used to inflate an inflatable device, without altering the inflation output flow through area of the inflator device.

Further, there is a continuing need and demand for further improvements in safety, simplicity, effectiveness, economy and reliability in the apparatus and techniques used for inflating an inflatable device such as an airbag cushion. More specifically, there is a need and a demand for an inflator device which can provide at least some of the benefits provided by the inflator of the above-identified Rink, U.S. Pat. No. 5,669,629, wherein a gas source material undergoes decompositional or dissociative-type reaction to form products including at least one gaseous product used to inflate an inflatable device while permitting either or both the design and control of the rise rate resulting from such an inflator device without altering the inflation output flow through area of the inflator.

SUMMARY OF THE INVENTION

A general object of the invention is to provide an improved apparatus for inflating an inflatable device and methods of operating such an inflation apparatus.

A more specific objective of the invention is to overcome one or more of the problems described above.

The general object of the invention can be attained, at least in part, through an apparatus for inflating an inflatable device which apparatus includes a heat source and a first chamber. The first chamber contains at least one gas source material which undergoes dissociation to form at cast one gaseous dissociation product used to inflate the inflatable device. The heat source includes a load of pyrotechnic and an initiator to initiate reaction of at least a portion of the pyrotechnic load to produce heat. The heat source is actuatable to be in heat transmitting communication with the contents of the first chamber to initiate dissociation of the at least one gas source material.

The prior art fails to provide an apparatus and a method for inflating an inflatable device such as an inflatable vehicle occupant restraint for use in an inflatable restraint system which permits either or both the design and control of the rise rate resulting from an inflator device such as an inflator device which contains a gas source material which undergoes decomposition or dissociation to form products, including at least one gaseous product used to inflate an inflatable device, without altering the inflation output flow through area of the inflator device.

The invention further comprehends an apparatus for inflating an inflatable device, which apparatus includes a heat source and a first chamber containing nitrous oxide. The heat source includes a load of pyrotechnic and an initiator to initiate reaction of at least a portion of the pyrotechnic load to produce heat. The heat source is actuatable to be in heat transmitting communication with the contents of the first chamber to initiate dissociation of at least a portion of the nitrous oxide to form at least one gaseous dissociation product used to inflate the inflatable device. The pyrotechnic is selected to provide at least about 95% of the total heat liberated by the reaction of the pyrotechnic prior to dissociation and release from the first chamber of associated dissociation product of more than about 90% of the gas source material originally contained within the first chamber.

The invention also comprehends methods for inflating an inflatable safety device in a vehicle.

One such method involves the step actuating an initiator to initiate reaction of at least a portion of a load of pyrotechnic to produce heat. At least a portion of the so produced heat is then transmitted to at least one gas source material in a first chamber of the apparatus to initiate dissociation of the at least one gas source material. The dissociation thereof forms dissociation products including at least one gaseous dissociation product. Inflation gas comprising at least a portion of the at least one gaseous dissociation product is then released from the apparatus to inflate the inflatable device.

As used herein, references to "dissociation," "dissociation reactions" and the like are to be understood to refer to the dissociation, splitting, decomposition or fragmentation of a single molecular species into two) or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

"Equivalence ratio" (100) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi = (F/O)_A / (F/O)_S \qquad (1)$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

A "pyrotechnic" material, in its simplest form, consists of an oxidizing agent and a fuel that produce an exothermic, self-sustaining reaction when heated to the ignition temperature thereof.

Other objects and advantages will be apparent to those skilled in the art from the following detailed description taken in conjunction with the appended claims and drawings.

BRIEF DESCRIPTION OF THE DRAWINGS

FIG. 4 is a graphical depiction of tank pressure as a function of time performance realized for the inflator assemblies utilized in Examples 1–6.

DETAILED DESCRIPTION OF THE INVENTION

Figure 1:
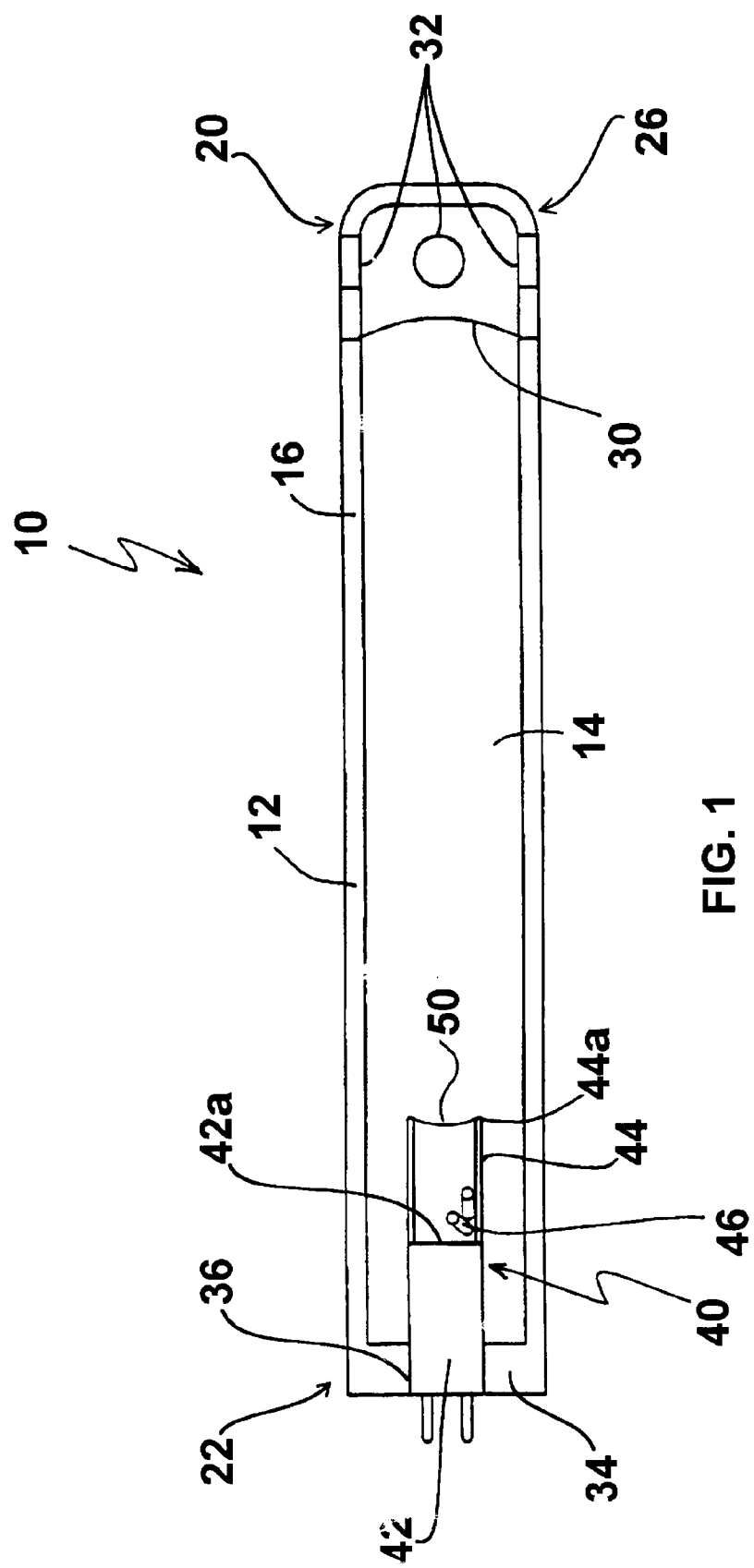
FIG. 1 is a simplified, partially in section, schematic drawing of an airbag inflator in accordance with one embodiment of the invention.

The present invention may be embodied in a variety of different structures. Referring initially to FIG. 1, there is illustrated an airbag inflator assembly, generally designated by the reference numeral 10, in accordance with one preferred embodiment of the invention and such as may be used to inflate an inflatable vehicle occupant restraint, e.g., an inflatable airbag cushion, (not shown). As is known and upon proper actuation, such inflatable vehicle occupant restraints are typically inflated by a flow of an inflation fluid, e.g., gas, from an inflator assembly to restrain movement of an occupant of the vehicle. In practice, it is common that the inflatable vehicle occupant restraints be designed to inflate into a location within the vehicle between the occupant and certain parts of the vehicle interior, such as the doors, steering wheel, instrument panel or the like, to prevent or avoid the occupant from forcibly striking such parts of the vehicle interior.

The invention is described hereinafter with particular reference to an inflator for use in various automotive vehicles including vans, pick-up trucks, and particularly automobiles. As will be appreciated by those skilled in the art, the invention has applicability to various types or kinds of airbag installations for automotive vehicles including driver side, passenger side and side impact airbag assemblies, for example. Moreover, the invention has applicability with other types of vehicles as well, including airplanes, for example.

The inflator assembly 10 comprises a pressure vessel 12 including a chamber 14 that contains a fluid load including a gas source material. As disclosed in above-identified Rink, U.S. Pat. No. 5,669,629, there are various gas source materials which, under specified conditions, undergo reaction variously termed decomposition or dissociation reaction to form products including at least one gaseous product such as may be used to inflate an associated vehicle occupant restraint. Thus, the chamber 14 is sometimes referred to herein as a "dissociation chamber."

As disclosed in Rink, U.S. Pat. No. 5,669,629, a wide variety of gas source materials which undergo dissociative or decompositional reactions, preferably an exothermic such reaction, to form gaseous products are available. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well is mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

Generally, dissociative gas source materials used in the practice of the invention are preferably:

a.) non-toxic and non-corrosive both in the pre- and post-dissociation states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the dissociation reaction, and which catalysts may be difficult to remove or handle; and d.) form products of dissociation which do not contain undesirable levels of undesirable species, such as carbonaceous material (e.g., soot), $CO_x$ and $NO_x$ (where x=1 or 2), and $NH_3$, for example.

A currently preferred dissociative gas source material for use in the practice of the invention is nitrous oxide ($N_2O$). Nitrous oxide is advantageously generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns. Further, in accordance with the chemical reaction (2) identified below, upon the dissociation of nitrous oxide, the dissociation products ideally are nitrogen and oxygen:

$$2N_2O = 2N_2 + O_2 \qquad (2)$$

Thus, not only does such reaction form products which are generally non-toxic and non-corrosive but also results in the production or formation of molecular oxygen, such as may be desired with certain inflator designs.

It is to be understood that such nitrous oxide can be, for example, stored in a gaseous, liquid or multi-phase form (i.e., partially gaseous and partially liquid mixture), as may be desired. The common premium in modern vehicle design placed on minimizing the size requirements for vehicular components such as inflatable restraint systems generally results in a preference for smaller sized airbag inflators. In view thereof and the fact that the density of nitrous oxide is significantly greater when in liquid, rather than gaseous form, one preferred embodiment of the invention involves storage of nitrous oxide primarily in a liquid form.

It is also to be understood that while such nitrous oxide dissociative gas source material can be contained within the dissociative chamber in a pure form (e.g., such that the chamber contents include no more than minor levels of other materials, such as air as may be present in the dissociative chamber prior to being filled with the dissociative gas source material), it may be preferred for the fluid load contained within the chamber to also include an inert gas therewith. For example, an inert gas such as helium can be included with nitrous oxide to facilitate leak checking of the inflator apparatus or, more specifically, of the dissociative chamber thereof. Alternatively or in addition, an inert gas, such as argon and helium, for example, or mixture of such inert gases, can be included to supplement the gas produced or formed upon the dissociation of the nitrous oxide.

Further, additionally or alternatively and as disclosed in the above-identified U.S. patent application Ser. No. 08/935,016, the fluid load within the dissociation chamber 14 may include a quantity of at least one radioactive isotope leak trace material whereby fluid leakage from the chamber can be detected as disclosed therein.

In addition, if desired, the fluid load within the dissociation chamber 14 may additionally include a quantity of oxygen gas such as in molecular form and such as may beneficially and desirably supplement such molecular oxygen as may be formed upon the dissociation of stored or included nitrous oxide.

Still further, the fluid load within such a dissociation chamber can, if and as desired, also include a sensitizer material to promote or accelerate the rate of such dissociative reaction. Various sensitizer materials are disclosed and identified in above-identified Rink, U.S. Pat. No. 5,669,629. As disclosed therein, sensitizer materials are typically hydrogen-bearing materials and are generally added to the dissociative gas source material in relatively small amounts. Specifically, the sensitizer material is preferably added to the dissociative gas source material in an amount below the flammability limits for the content mix, such that the contents of the dissociative chamber are generally at an equivalence ratio of less than 0.25, preferably less than 0.15. At such low relative amounts, the chamber contents are essentially non-flammable and thus combustion and the formation of combustion products are practically avoided.

Hydrogen-bearing sensitizer materials useable in the practice of the invention are typically gaseous, liquid, solid, or multi-phase combinations thereof including hydrogen, hydrocarbons, hydrocarbon derivatives and cellulosic materials. Preferred hydrocarbon hydrogen-bearing sensitizer materials useable in the practice of the invention include paraffins, olefins, cycloparaffins and alcohols. Molecular hydrogen ($H_2$), which does not result in the formation of carbon oxides such as carbon monoxide or carbon dioxide, has been found to be quite effective as a sensitizer and is an especially preferred hydrogen-bearing sensitizer material for use in the practice of the invention.

Returning to the FIG. 1, the chamber 14 is defined in part by an elongated generally cylindrical sleeve 16. The sleeve 6 may include a fill port (not shown), as is known in the art, wherethrough materials can be passed into the chamber 14.

In practice, in such an inflator design that uses about 10% to about 30% (by volume) nitrous oxide in an inert gas such as argon, such a dissociation chamber 14 is typically filled to a pressure in the range of about 3500 psia (24.1 MPa) to about 4500 psia (31.0 MPa). On the other hand, such inflator designs that contain nitrous oxide in a pure or nearly pure state (e.g., contain about 90% up to 100% by volume nitrous oxide), may typically be filled to pressures of about 500 psia (3.4 MPa) to about 2500 psia (17.2 MPa).

The sleeve 16 has a first end 20 and a second end 22. The first end 20 is closed by means of a diffuser assembly 26. Such a diffuser assembly can be integral (i.e., formed continuous with and in one piece) with the sleeve 16 or, if desired or preferred, joined or attached thereto in an appropriate manner, such as by an inertial weld.

The contents of the chamber 14 are normally kept separated from the diffuser assembly 26 and contained within the chamber 14 through the inclusion of a selected sealing means, e.g., by means of a burst disc 30 in sealing relationship therebetween. The diffuser assembly 26 includes i plurality of openings 32, wherethrough the inflation gas from the inflator assembly 10 is properly dispensed into the associated occupant restraint. Thus, the diffuser assembly 26 can serve to facilitate direction of the inflation fluid from the inflator assembly 10 into the associated inflatable vehicle occupant restraint.

The sleeve second end 22 is partially closed by a base wall 34. The base wall 34 includes an opening 36 therein, wherethrough a heat source 40, such as described in greater detail below, is attached in sealing relation within the dissociation chamber 14. As will be appreciated, such attachment can be effected by various appropriate means such as with a weld, crimp or other suitable hermetic seal, for example.

In accordance with one preferred embodiment of the invention, the heat source 40 is actuatable to be in heat transmitting communication with the contents of the dissociation chamber 14 to initiate dissociation of the at least one gas source material stored therewithin. The heat source 40 includes an initiator device 42 and a cup 44 containing a load of a selected fuel material, such as a pyrotechnic material. As described in greater detail below, such a fuel material may as desired take the form of a pyrotechnic material, such as defined above, or a fuel such as contains insufficient oxygen to produce a self-sustaining exothermnic reactions when heated to the ignition temperature thereof.

A representative portion of the heat source pyrotechnic load, designated by the reference numeral 46, is shown. The pyrotechnic load 46 is generally adjacent the discharge end 42a of the initiator device 42 such as in reaction initiation communication with the initiator device 42.

The heat source cup 44 is shown as including a burst disc 50 about the open end 44a thereof. It is to be appreciated that the inclusion of such a burst disc may be desired or needed to ensure hermeticity such as where the heat source may be incapable of withstanding the elevated pressures normally associated with the storage of material within the dissociation chamber for the extended periods of time that such inflator devices are normally placed in vehicular occupant inflatable restraint systems. It will also be appreciated that other forms or means of separation can, if desired, be utilized including, for example, a retainer in the form of an appropriate foil.

Further, it will be appreciated that the inclusion of such a burst disc 50 or other suitable closure at the open end 44a of the heat source cup 44 will better ensure that the pyrotechnic load 46 of the heat source 44 will remain desirably positioned relative to the initiator discharge end 42a throughout the lifetime of the unactuated inflator assembly.

The initiator device 42 can be of any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of an ignition pyrotechnic charge.

Such ignition charge pyrotechnic can be variously formulated, as is known in the art. In general, such an ignition charge pyrotechnic desirably has a calorific content of about 5 to about 75 calories and, more preferably, about 15 to about 40 calories, per gram of inflator assembly fluid load.

In practice, pyrotechnic formulations for initiators are often designed to be over-oxidized to better ensure complete combustion of the fuel. For example, typical initiators containing a pyrotechnic formulation of zirconium potassium perchlorate (commonly referred to as "ZPP") have a formulation equivalence ratio in a range of 0.7 to 1.0. Generally speaking, initiator formulations having an equivalence ratio of greater than one have been sought to be avoided as such formulations generally contain insufficient oxidant to fully oxidize the available fuel and thus such fuel will not contribute to the sought reaction.

As disclosed in parent patent application, U.S. Ser. No. 09/027,020 filed on Feb. 20, 1998, it may be desirable that the initiator device include a desired load of an enhanced fuel pyrotechnic charge. More specifically, such an initiator device contains a pyrotechnic formulation, such that upon actuation of the initiator device, the discharge serves to form particles to interact with one or more of at least a portion of the remaining quantity of the gas source material contained within the inflator and dissociation products to form additional inflation products for inflating the inflatable device. In accordance with one preferred embodiment of such invention, such an enhanced pyrotechnic formulation discharges hot particles into contact with the dissociating gas source material contained within the inflator assembly. In such formulations it is generally desirable to maintain the hot radiant metal fuel particles in a relative amount to the quantity of nitrous oxide within the dissociation chamber to result in an equivalence ratio of less than 0.15.

In one embodiment, such an enhanced fuel pyrotechnic formulation constitutes a metal-based pyrotechnic composition, such as ZPP, which is oxidized to a lesser extent, e.g., often near stoichiometric or at least sightly fuel-rich, than normally associated for a composition of such a pyrotechnic material. However, various handling concerns may arise with the production and use of relatively large loads of ZPP such as may be needed to better ensure proper operation of such inflator devices. In view thereof, U.S. Ser. No. 09/027,020 has proposed the use of metal hydride pyrotechnic materials such as zirconium hydride potassium perchlorate (ZHPP) and titanium hydride potassium perchlorate (THPP) which are generally significantly safer to handle than metal perchlorates (such as ZPP).

Many different reactive materials are available and useful as heat source fuel or pyrotechnic materials. Suitable materials are suitable for use in the practice of the invention may include, for example, polyolefins, waxes and internally partially oxidized compounds such as polyesters, polyethers, acrylic polymers, phenols, polysaccharides (such as cellulose or starch), cellulose ethers, cellulose esters, nitrate salts of amines, nitramines, nitrocompounds and mixtures of two or more such listed materials. More specifically, suitable solid fuel materials for use in the practice of the invention may be exemplified by ethyl cellulose, cellulose acetate, cellulose acetate butyrate, cellulose propionate, polyacetal, polyethylene, polypropylene, polystyrene, hydroxy-terminated polybutadiene, polymethylacrylate, naphthalene, and nitrocellulose, as well as combinations thereof.

In general, these heat source reactive materials can be classified into two general categories or types: those that are fully- or self-oxidized (i.e., they do not generally require an additionally provided oxidant) and those that are under-oxidized (i.e., they generally require an additionally provided oxidant). Operation with an under-oxidized heat source reactive material, however, will typically require some oxidant contribution from either or both the stored nitrous oxide or the balance of the fluid load of the inflator in order to properly bum and thus result in the lose of some of the independence of operation normally possible with a similar inflator containing a fully- or self-oxidized heat source pyrotechnic material. While such under-oxidized materials may ignite, they generally are incapable of burning to completion without such an oxidant contribution. In general, with such an under-oxidized material which ignites with the functioning of the initiator device 42 and discharges or interacts with the nitrous oxide-including mixture contained within the dissociation chamber 14, heat produced from the reaction of the reactive material is transferred to the nitrous oxide and dissociation thereof commences, resulting in the formation of gaseous oxygen which interacts with under-oxidized reactive material to permit the combustion thereof As will be appreciated, self-oxidized pyrotechnic materials can simplify the operational dynamics of the inflator as such materials generally do not require direct interaction with the stored nitrous oxide, or the dissociation products thereof, in order to properly burn. In general, such self-oxidized materials will ignite with the functioning of the initiator 42 and discharge or interact with the nitrous oxide-including mixture contained within the dissociation chamber 14. Heat, resulting from the reaction of the heat source reictive material, is transferred to the nitrous oxide and dissociation thereof commences.

Such heat source pyrotechnic or other reactive material can be variously formulated, as is known in the art. In general, such heat source reactive fiel materials desirably have generally higher energy contents than ignition charge pyrotechnics, if such ignition charge pyrotechnics are used. More specifically, such heat source pyrotechnic or other reactive fuel material generally desirably has a calorific content of about 75 to about 300 calories and, more preferably, about 100 to about 175 calories per gram of inflator assembly fluid load.

In operation, such as upon the sensing of a collision, an electrical signal is sent to the initiator device 42. The initiator device 42 functions to initiate reaction of at least a portion of the pyrotechnic load 46 such as to result in the rupture or otherwise opening of the burst disc 50 sealing the heat source cup 44. As will be appreciated such rupture or otherwise opening of the burst disc 50 may result in particularly designed assemblies from either or both an increase of pressure within the cup 44, such as due to the formation of gaseous products upon reaction of pyrotechnic material, and the direction or discharge of hot particles at the burst disc 50.

With the opening of the cup 44, high temperature combustion products are discharged therefrom into the dissociation chamber 14 to initiate dissociation of at least a portion of the quantity of gas source material contained therewithin, which in a preferred embodiment includes primarily liquid-phase $N_2O$. The large heat addition from the heat source 40 desirably results in commencement of the exothermic thermal dissociation of the $N_2O$. In this thermal dissociation, the $N_2O$ begins to breakdown into smaller molecular fragments. As the $N_2O$ molecules fragment, the associated release of energy results in further heating of the remaining chamber contents. The increase both in temperature and the relative amount of gaseous products within the dissociation chamber 14 results in a rapid pressure rise within the dissociation chamber.

When the gas pressure within the dissociation chamber 14 exceeds the structural capability of the burst disc 30, the disc ruptures or otherwise permits the passage of the inflation gas into the diffuser assembly 26 and subsequently through the openings 32 therein into an associated airbag assembly.

As described in greater detail below, the geometry of a fuel material or pyrotechnic formulation can, for example, impact either or both the rate at which a gas source material dissociates and the amount (i.e., extent) of such dissociation. Thus, in accordance with the invention, the geometry of a fuel material or pyrotechnic formulation and, in particular, various parameters and characteristics thereof can be selected to provide or result in particular or desired operation of a corresponding inflator device. For example, fuel material or pyrotechnic formulation parameters and characteristics such as quantity, size and shape, may each be selected, as described in greater detail below, in order to assist in providing desired operation of an associated inflator device.

With respect to size, it is generally desirable to maintain the particle diameter in pyrotechnic or other such fuel formulations in a range of about 1 to about 20 microns and, more particularly, in a range of about 1 to about 10 microns. In accordance with the invention, however, the inclusion of some larger particles of fuel in such formulations is generally desired. In practice. such larger particles can be distributed in a range of from about 25 to about 10,000 microns, preferably particles of a diameter of up to about 1000 microns and, more specifically, particles of a diameter of up to about 500 microns.

It will be appreciated that while such larger particles may constitute up to about 100% of the fuel content of such pyrotechnic or fuel formulations in accordance with the invention, in general it is believed desirable to limit inclusion of such larger particles to no more than about 50% by mass, and, more preferably, no more than about 25% by mass of the total fuel load.

Shape, in conjunction with size, may also play a significant role in the practice of the invention. As will be appreciated, if the particles are relatively fine and the pyrotechnic or fuel formulation features a relatively high surface area, the formulation will generally burn very rapidly and may result in high internal pressures within the inflator and less or incomplete dissociation of the nitrous oxide. On the other hand, if the particles are too large, they can be relatively difficult to ignite and thus may not ultimately be utilized or at least fully utilized in the invention.

Figure 2:
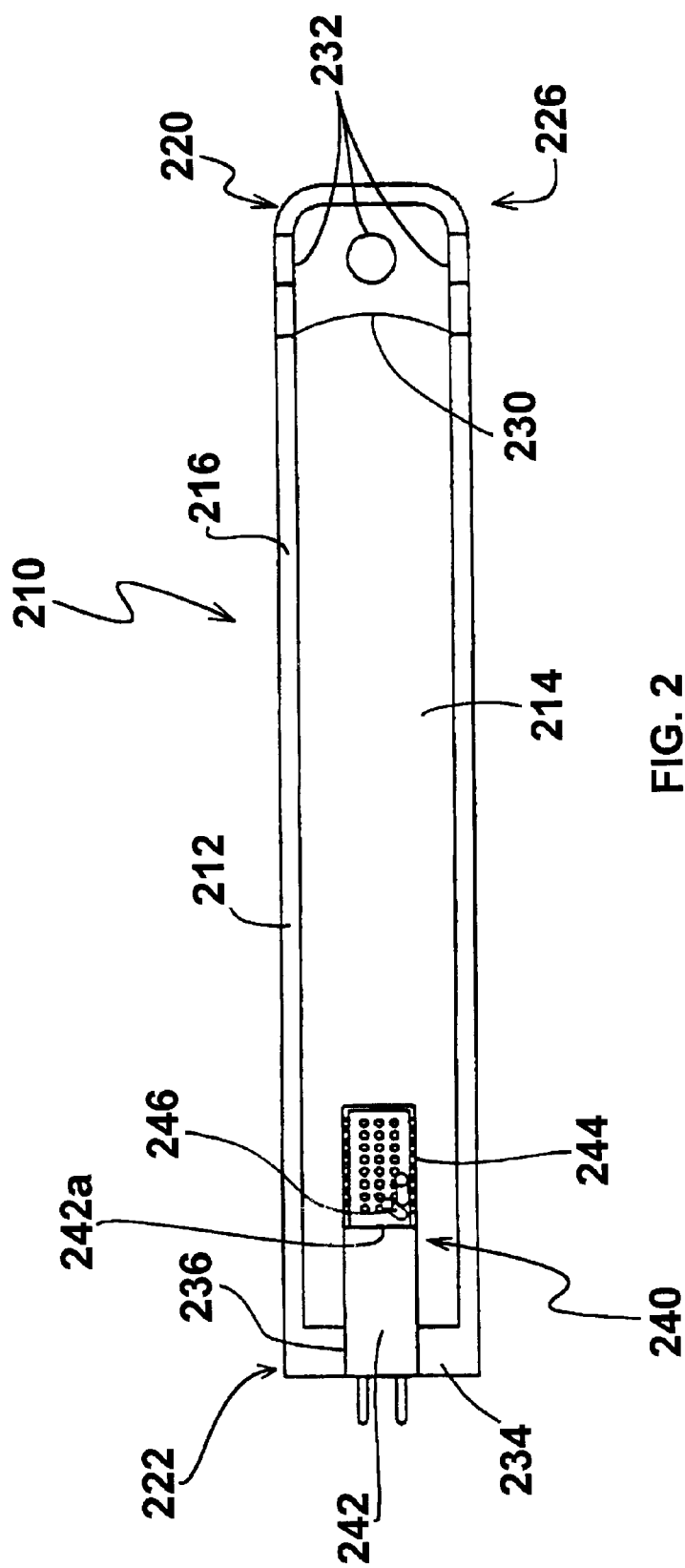
FIG. 2 is a simplified, partially in section, schematic drawing of an airbag inflator in accordance with an alternative embodiment of the invention.
Figure 3A:
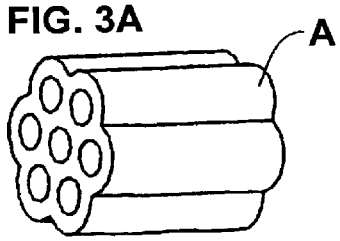
FIGS. 3A–3F are simplified perspective views of pyrotechnic grain configurations used in Examples 1–6, respectively.

FIG. 2 illustrates an airbag inflator assembly 210 in accordance with an alternative embodiment of the invention. The inflator assembly 210 is generally similar to the inflator assembly 10 illustrated in FIG. 1 and described above. The inflator assembly 210, similar to the inflator assembly 10, includes a pressure vessel 212 including a chamber 214 that contains a gas source material, such as described above. The chamber 214 may, if desired and as described above, additionally contain quantities of one or more inert gases, radioactive isotope leak trace material, oxygen gas, or rate of dissociative reaction sensitizer materials.

The chamber 214 is defined in part by an elongated generally cylindrical sleeve 216 having a first end 220 and a second end 222. The first end 220 is closed by means of a diffuser assembly 226, such as generally similar to the diffuser assembly 26 described above. The diffuser assembly 226 includes a plurality of openings 232, wherethrough the inflation gas from the inflator assembly 210 is properly dispensed into the associated occupant restraint (not shown).

The contents of the chamber 214 are normally kept separated from the diffuser assembly 226 and contained within the chamber 214 through the inclusion of a selected sealing means, e.g., by means of a burst disc 230 in sealing relationship therebetween.

The sleeve second end 222 is partially closed by a base wall 234. The base wall 234 includes an opening 236 therein, wherethrough a heat source 240 such as described in greater detail below, is attached in sealing relation within the dissociation chamber 214. As will be appreciated, such attachment can be effected by various appropriate means such as with a weld, crimp or other suitable hermetic seal, for example.

The heat source 240, similar to the heat source 40 described above, includes an initiator device 242 and a cup 244 containing a load of pyrotechnic or other selected fuel material such as described above, designated by the reference numeral 246 adjacent the discharge end 242a of the initiator device 242 such as in reaction initiation communication with the initiator device 242. The heat source 240, however, stores or contains the pyrotechnic load 246 under the influence of the contents of the dissociation chamber 214. More specifically, the cup 244 is composed of perforated or the like, such as screen, for example, steel or other selected metal to permit contact by and between the contents of the dissociation chamber 214 and the stored pyrotechnic material 246. Such inflator assemblies in which such heat source load of pyrotechnic material 246 is stored under the conditions within the dissociation chamber 214 may be less subject to internal pressure extremes upon actuation and thus preferred for at least certain particular inflator installations.

In addition, as such inflator assemblies may more easily permit interaction and communication by and between the pyrotechnic material 246 and the contents of the dissociation chamber 214, such assemblies may facilitate the use of under-oxidized heat source pyrotechnic materials such as described above. For example, with such assemblies, oxidizer such as available or produced by or in the dissociation chamber may be in reaction communication with the stored pyrotechnic material and thus facilitate or permit reaction therewith.

The operation of the inflator assembly 210 is generally similar to that described above relative to the inflator assembly 10. For example, in the event of the sensing of a collision, an electrical signal is sent to the initiator device 242. The initiator device 242 fuinctions to initiate reaction of at least a portion of the pyrotechnic load 246 such as may result in the discharge of products of such reaction from the cup 244 and into communication with the gas source material contained within the chamber 214.

As will be appreciated, high temperature combustion products are discharged from the cup 244 into the dissociation chamber 214 to initiate dissociation of at least a portion of the quantity of gas source material contained therewithin, which in a preferred embodiment includes primarily liquid-phase $N_2O$. The large heat addition from the heat source 240 desirably results in comlmencement of the exothermic thermal dissociation of the $N_2O$. In this thermal dissociation, the $N_2O$ begins to breakdown into smaller molecular fragments. As the $N_2O$ molecules fragment, the associated release of energy results in further heating of the remaining chamber contents. The increase both in temperature and the relative amount of gaseous products within the dissociation chamber 214 results in a rapid pressure rise within the dissociation chamber.

Consequently and similar to the above-described embodiment, when the gas pressure within the dissociation chamber 214 exceeds the structural capability of the burst disc 230, the disc ruptures or otherwise permits the passage of the inflation gas into the diffuser assembly 226 and subsequently through the openings 232 therein into an associated airbag assembly.

The present invention is described in further detail in connection with the following examples which either or both illustrate or simulate various aspects involved in the practice of the invention. It is to be understood that all changes that come within the spirit of the invention are desired to be protected and thus the invention is not to be construed as limited by these examples.

EXAMPLES

The following examples illustrate the effect of the surface area of the respective heat source fuel material. As described in greater detail below, test inflator devices were used containing a selected fuel material in the form of:

1) a single continuous pyrotechnic grain of selected size and dimensions (Examples 1–6),
2) a plurality of extrudlets of pyrotechnic material, e.g., where each extrudlet has the shape or form of a tubular segment having or including a generally cylindrical bore (Examples 7–11), and
3) a fiel/oxidizer pyrotechnic material composed of a fuel having a selected particle size (Examples 12–14), respectively.

In each of these examples, a test inflator containing the corresponding pyrotechnic material and a specified dissociating gas load was fired into a closed (constant volume) vessel, also referred to as a "test tank." The portion of the inflator which vents gas was wholly contained within the tank so that the volume of the tank was completely closed off from the outside atmosphere. For each example, the pressure within the inflator and within the test tank were continuously monitored and recorded via respectively mounted pressure transducers.

Examples 1–6

In these Examples, test inflators each containing a specific one of the six (6) below identified grain configurations of a PVC-based pyrotechnic formulation were fired using a 100 liter-closed tank as the test tank.

More specifically, the PVC-based pyrotechnic formulation was composed of (on a mass basis):

about 45% 90 micron particle size potassium perchlorate;
about 30% 10 micron particle size potassium perchlorate;
about 9% dioctyl abipate;
about 8% sodium oxalate;
about 7.5% PVC; and
the balance being minor amounts of various additives.

This formulation was prepared in the six (6) different initial grain configurations (individually designated A–F) shown in FIGS. 3A–3F, respectively. The grain configurations A–F had the initial surface areas ($A_I$) respectively shown in the TABLE 1, below.

TABLE 1

| Example | Grain Configuration | $A_I$ (in$^2$) |
|---|---|---|
| 1 | A | 10.485 |
| 2 | B | 8.5 |
| 3 | C | 7.5 |
| 4 | D | 5.1 |
| 5 | E | 4.89 |
| 6 | F | 8.92 |

While each of the grain configurations, as indicated, provided a different respective initial surface area, the inflators of each of Examples 1–6 utilized 20 grams of the respectively configured pyrotechnic material. Each such 20 gram load had an energy content of 25000 calories (104.7 kilojoules). In each of these examples, the specified pyrotechnic grain configuration was used as the heat source material relative to a dissociation chamber containing a 162 gram fluid load of 20% nitrous oxide, 70% argon and 10% helium (on a molar basis).

DISCUSSION OF RESULTS

The tank pressure traces obtained for the inflators in Examples 1–6 are shown in FIG. 4 which shows gas output measured in terms of tank pressure versus time. The pressure traces obtained within the inflators ("combustion pressures") of Examples 1–6 (as measured by a pressure transducer mounted in a dissociating chamber wall of the inflator) are shown in FIG. 5.

As shown by FIG. 4, the rate of pressure increase in the test tank for Examples 1–6 (as evidenced in FIG. 4 by the initially increasing slopes of the curves), e.g., the rise rate, was directly related to the initial pyrotechnic grain surface area. More specifically, the rate of pressure increase in the test tank was greater for those examples featuring higher surface area pyrotechnic configurations.

Figure 5:
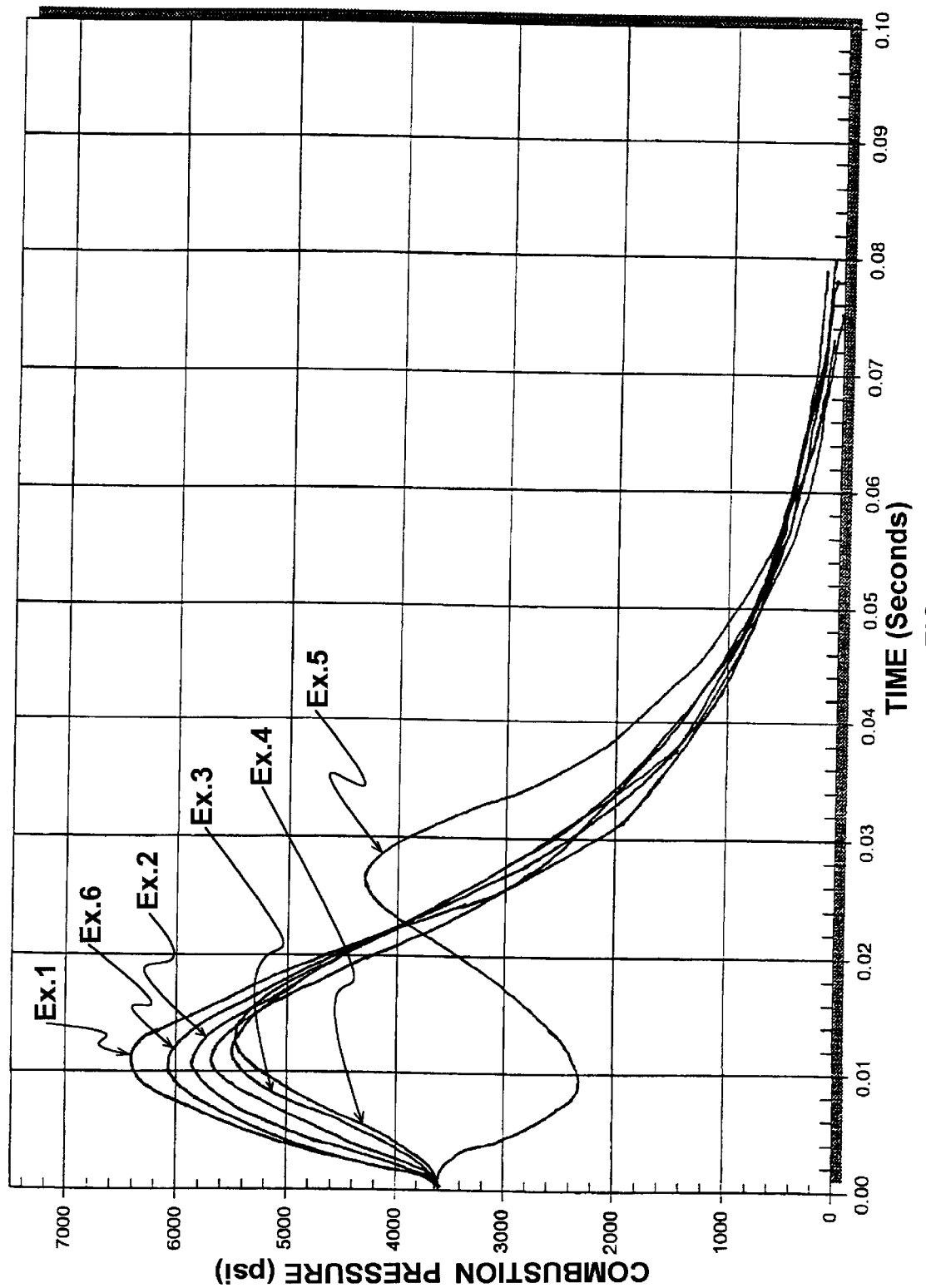
FIG. 5 is a graphical depiction of pressure versus time performance realized within the dissociation chamber of the inflator assemblies of Examples 1–6, following actuation of the respective test inflator.

As shown by FIG. 5, both the maximum internal pressure and the rate of initial increase of internal pressure for Examples 1–6 correlated well with the initial pyrotechnic grain surface area. More specifically, the maximum internal pressure (as evidenced in FIG. 5 by the respective curve peaks) and the rate at which the internal pressure initially increased (as evidenced in FIG. 5 by the initial curve slopes, e.g., the slopes of the curves within the first 0.01 seconds after actuation) both generally increased with the use of pyrotechnic of increased initial surface area. Thus, the rate of combustion of the pyrotechnic appears to be directly proportional to the surface area of the pyrotechnic grain.

Examples 7–11

In these Examples, test inflators each containing a specific one of the five (5) below identified extrudlet sizes of a pyrotechnic formulation composed of a transition metal amine nitrate with oxidizer and binder were fired using a 100 liter-closed tank as the test tank.

Figure 6:
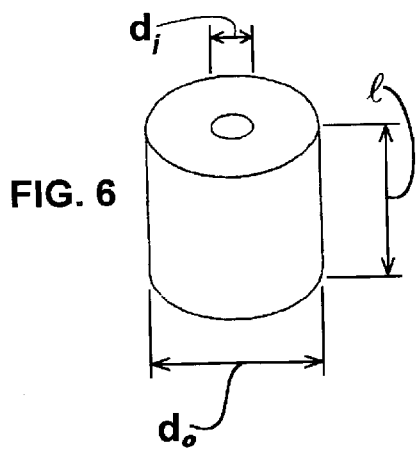
FIG. 6 is a generalized representation of the extrudlet pyrotechnic forms used in Examples 7–11.
Figure 3B:
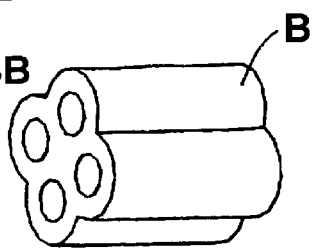
Figure 3C:
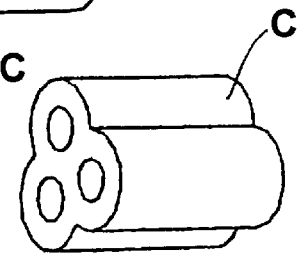
Figure 3D:
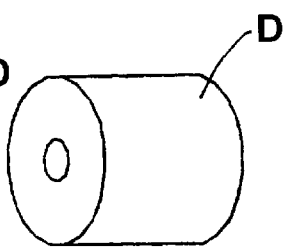
Figure 3E:
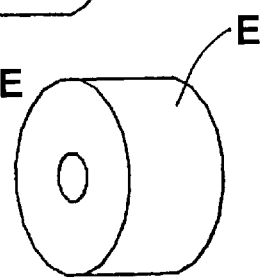
Figure 3F:
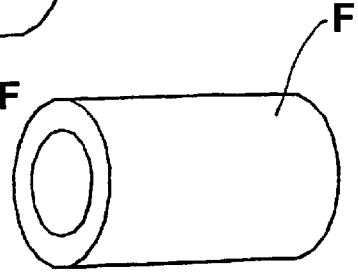

More specifically, the extrudlets utilized in each of Examples 7–11 were generally of the shape or form of tubular segments having or including a generally cylindrical bore, such as shown in FIG. 6. For each of Examples 7–11: the initial extrudlet outside diameter ($d_o$), the initial extrudlet inside diameter ($d_i$), initial extrudlet length (l) are identified in TABLE 2, below. TABLE 2 also identifies the initial surface area of the respective individual extrudlets ($A_e$), the quantity or number of extrudlets (Q), as well as the total initial extrudlet surface area ($A_t$, where $A_t=QA_e$), for each of Examples 7–11.

TABLE 2

| Example | $d_0$ (in) | $d_1$ (in) | 1 (in) | $A_e$ (in$^2$) | Q | $A_t$ (in$^2$) |
|---|---|---|---|---|---|---|
| 7 | 0.250 | 0.062 | 0.250 | 0.3371 | 57 | 19.21 |
| 8 | 0.187 | 0.042 | 0.187 | 0.1868 | 132 | 24.65 |
| 9 | 0.150 | 0.042 | 0.150 | 0.1230 | 279 | 34.32 |
| 10 | 0.128 | 0.042 | 0.125 | 0.0897 | 459 | 41.17 |
| 11 | 0.090 | 0.035 | 0.090 | 0.0461 | 1139 | 52.51 |

While each of the extrudlet forms provided a different respective initial surface area, as indicated, in each of Examples 7–11, the same mass of the pyrotechnic formulation (16 grams) was used. As will be appreciated, as the size of the extrudlets used in each of Examples 7–11 was different, the number of extrudlets required to achieve 16 grams of material also differed for each of these examples.

In each of Examples 7–11, the 16 grams of the pyrotechnic formulation was used as the heat source material relative to a dissociation chamber containing a 163 gram fluid load of 20% nitrous oxide, 70% argon and 10% helium (on a molar basis).

DISCUSSION OF RESULTS

Figure 7:
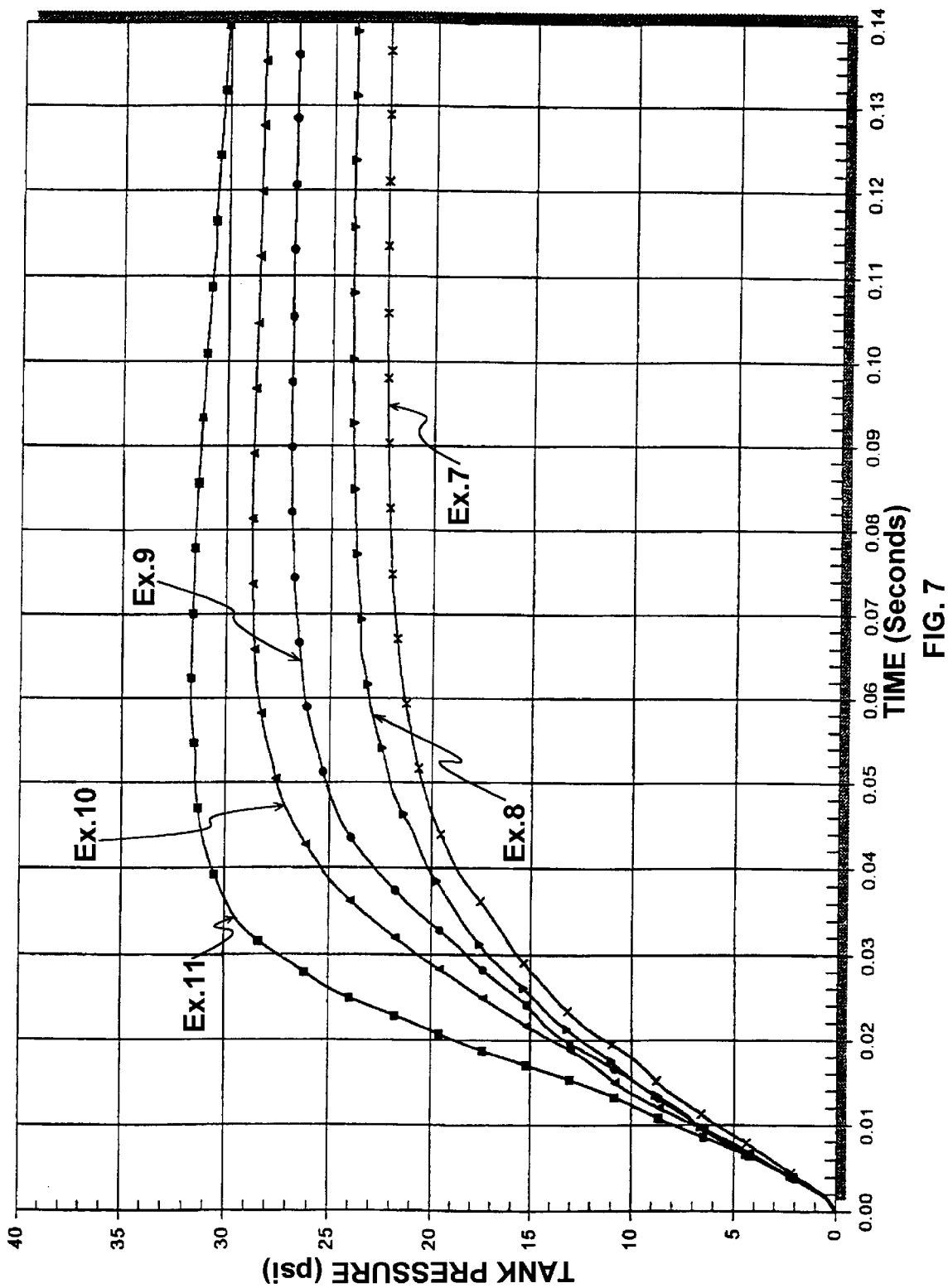
FIG. 7 is a graphical depiction of tank pressure as a function of time performance realized for the inflator assemblies utilized in Examples 7–11.

The tank pressure traces obtained for the inflators in Examples 7–11 are shown in FIG. 7 which shows gas output measured in terms of tank pressure versus time. The pressure traces obtained within the inflators of Examples 7–11 (as measured by a pressure transducer mounted in a dissociating chamnber wall of the inflator) are shown in FIG. 8.

As shown in FIG. 7, the maximum tank pressure clearly decreased as the total surface area of the extudlets decreased. This is attributable to a larger fraction of the stored gas load passing into the test tank without having been heated by the combustion products since the rate of combustion decreased as the total surface area of extrudlets decreased.

Figure 8:
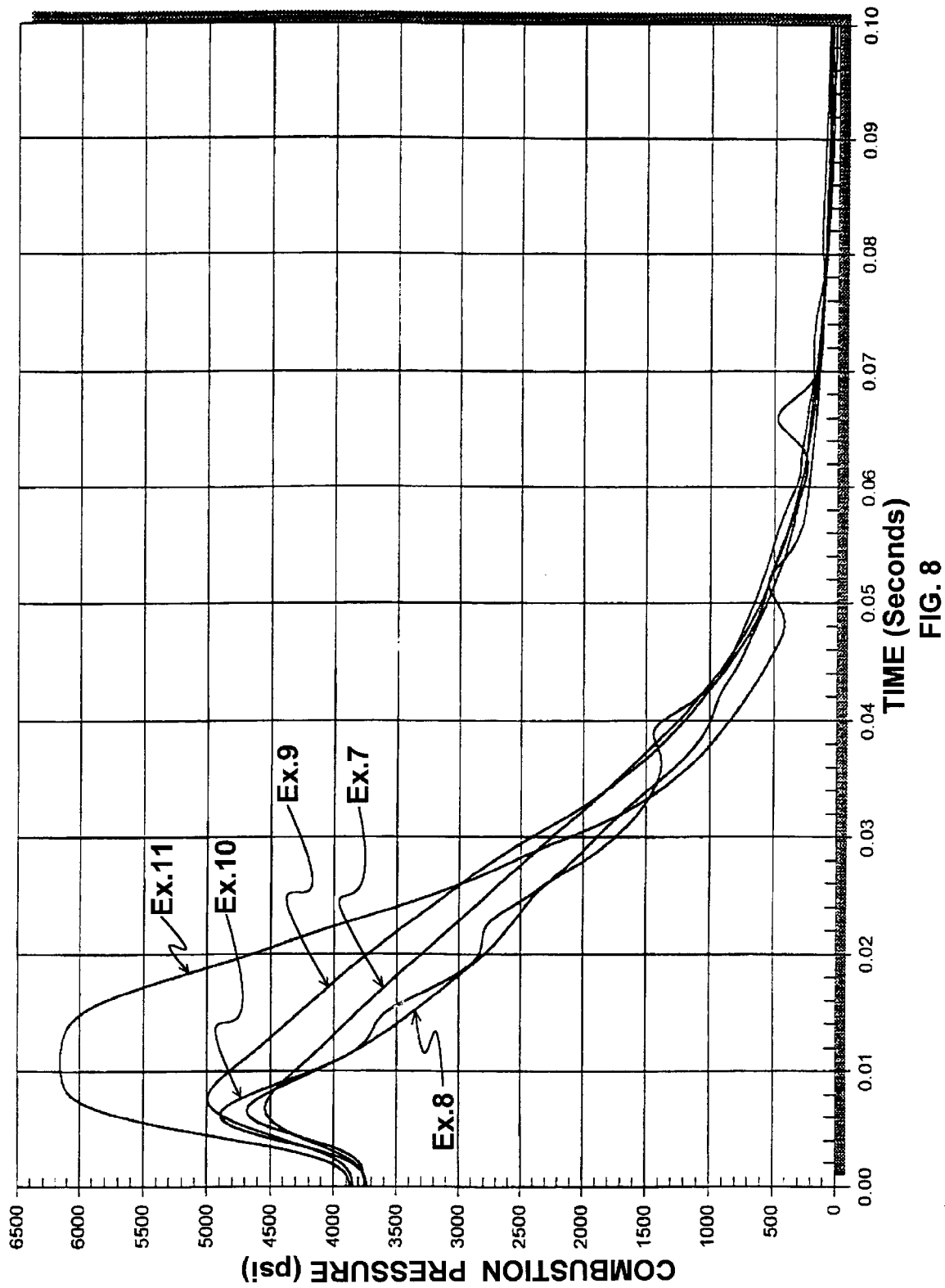
FIG. 8 is a graphical depiction of pressure versus time performance realized within the dissociation chamber of the inflator assemblies of Examples 7–11, following actuation of the respective test inflator.

As shown in FIG. 8, the maximum internal pressure within the pressure vessel generally increased as the total extrudlet area increased. This is indicative of more heat being added to the stored gas as the total surface area in increased.

Examples 12–14

In these Examples, test inflators each containing a 1.0 gram load of fuel/oxidizer pyrotechnic material composed of 23% titanium (Ti) and 77% cupric oxide (CuO), percents on a mass basis, were fired using a 60 liter-closed tank as the test tank. In each of Examples 12–14, the particle size of the fuel constituent (Ti) was varied as shown in TABLE 3, below, using Ti particles of a particle size of 75 μm and 150 μm.

TABLE 3

| | Ti Mass Fraction | |
|---|---|---|
| Example | 75 μm | 150 μm |
| 12 | 1.0 | 0 |
| 13 | 0.5 | 0.5 |
| 14 | 0 | 1.0 |

In each of Examples 12–14, the 1.0 gram load of the pyrotechnic formulation was used as the heat source material relative to a dissociation chamber containing a 54.4 grams of a fluid load composed of 40% nitrous oxide, 50% argon and 10% helium (on a molar basis).

DISCUSSION OF RESULTS

Figure 9:
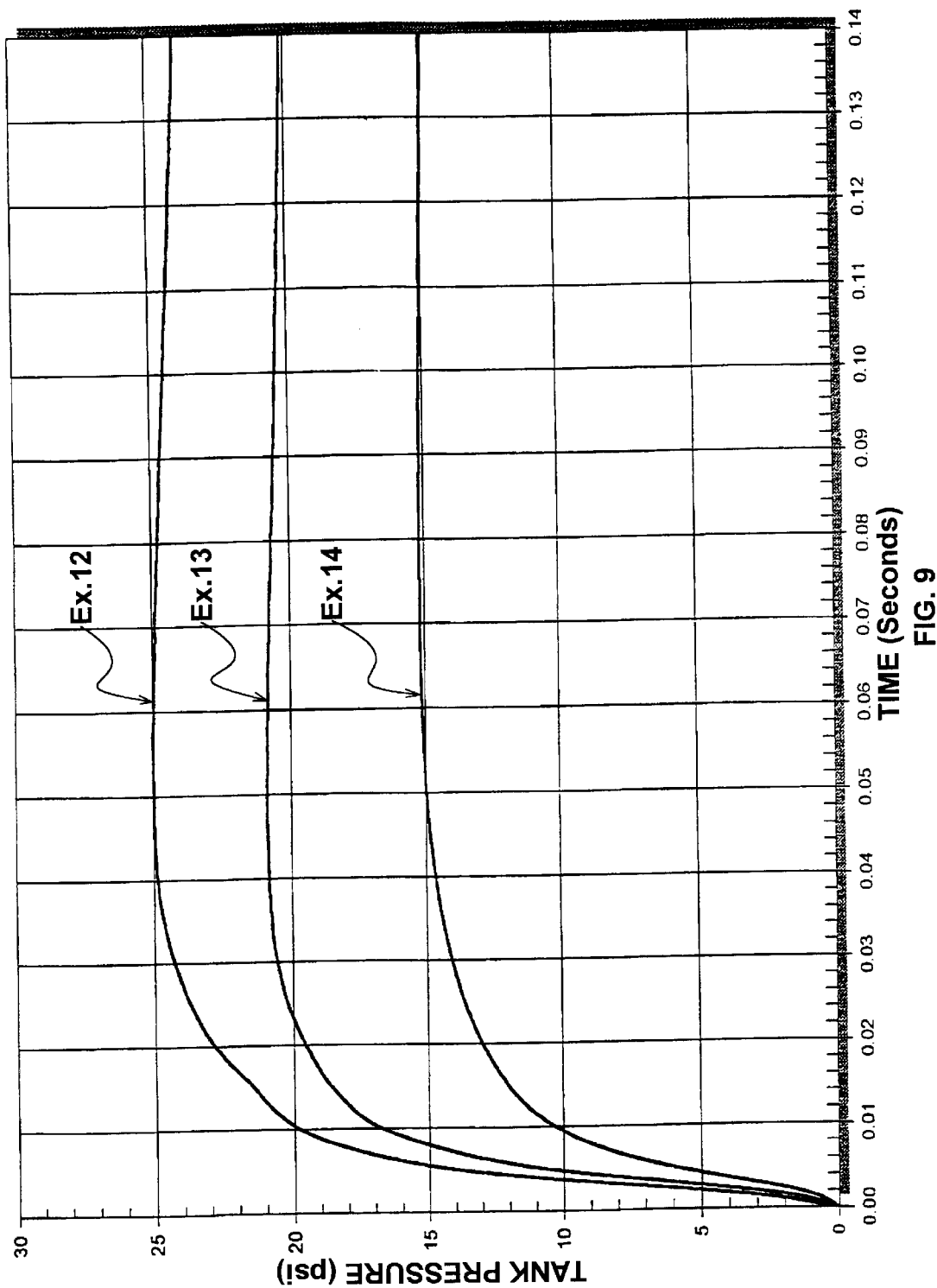
FIG. 9 is a graphical depiction of tank pressure as a function of time performance realized for the inflator assemblies utilized in Examples 12–14.
Figure 10:
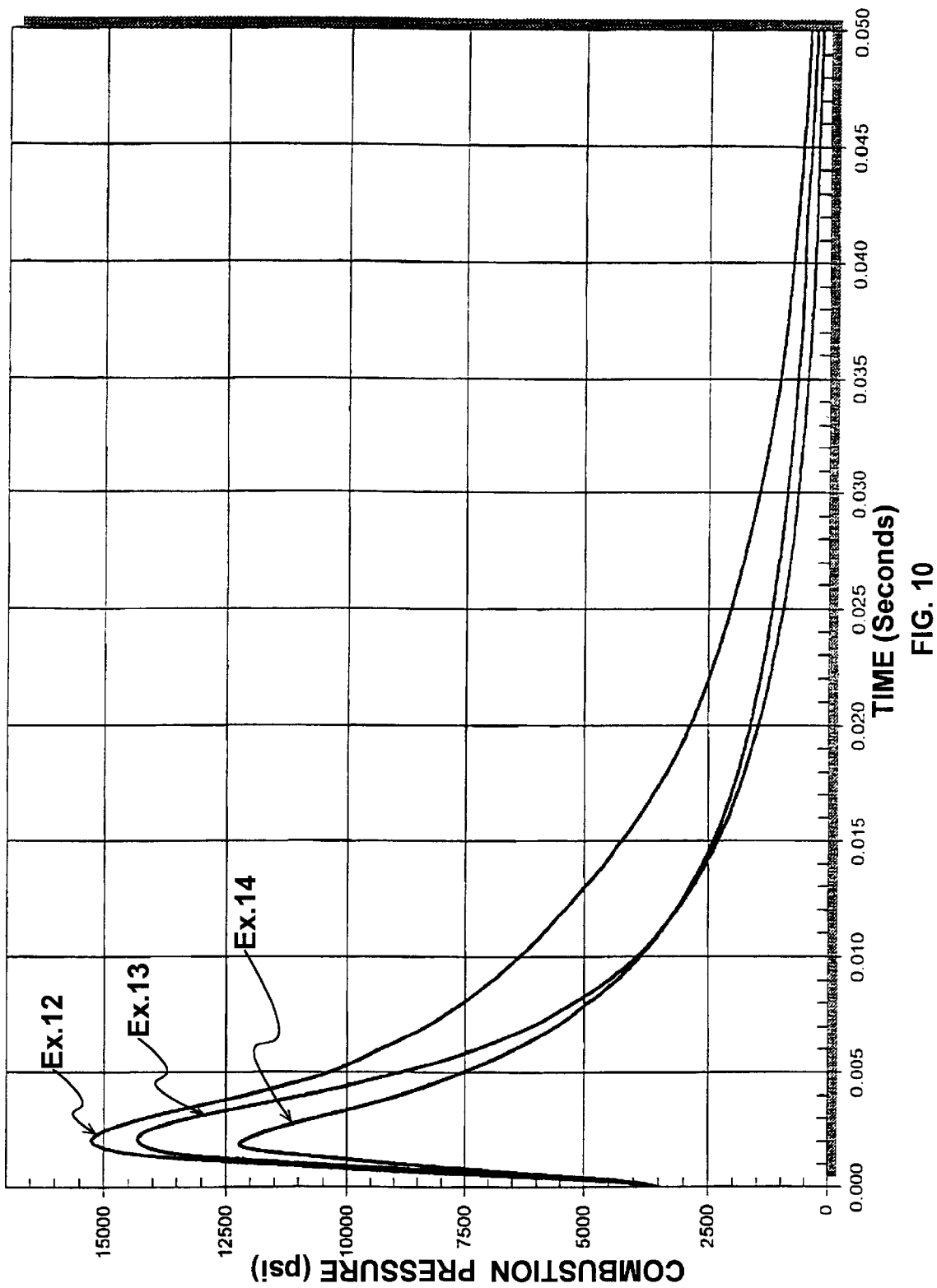
FIG. 10 is a graphical depiction of pressure versus time performance realized within the dissociation chamber of the inflator assemblies of Examples 12–14, following actuation of the respective test inflator.

FIGS. 9 and 10 illustrate the pressure versus time traces obtained in the associated test tank and within the inflator pressure vessel itself, respectively.

It is clear that as the fuel particle size is decreased, the maximum tank pressure increased. (See FIG. 9) Analysis of the effluent gases from these tests also indicates that the amount of nitrous oxide dissociation increased as particle size decreased. Analysis of the gas mixture obtained from the large particle (150 microns) test indicated about 6% nitrous dissociation. The percentage nitrous oxide dissociation increased to about 26% for the blended mixture test, and increased further to about 31% for the small particle test. Although the effect of particle size on the rise rate was unclear, it appears that the smaller fuel particles participated more fully in the reaction, thereby releasing more heat and resulting in higher maximum tank pressures. This conclusion is further supported by the internal pressure characteristics, as shown in FIG. 10. In FIG. 10, the smallest particle size pyrotechnic clearly produced the highest internal pressure, while the largest particle size produced the lowest internal pressure.

Figure 11:
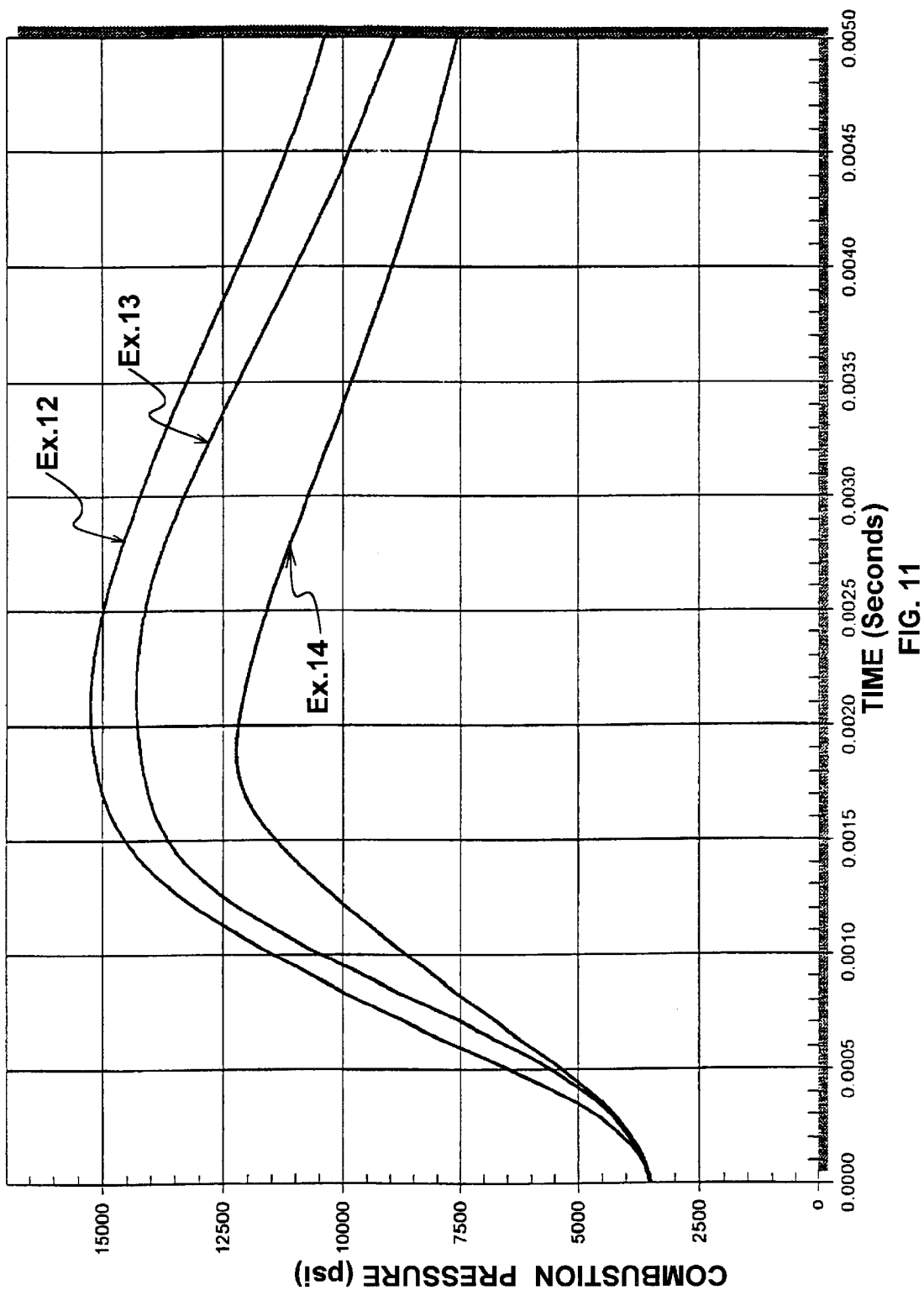
FIG. 11 is a graphical depiction of a portion of the pressure versus time performance realized within the dissociation chamber of the inflator assemblies of Examples 12–14 shown in FIG. 10, but now shown on an enlarged scale.

It is interesting to note that in FIG. 10 the particle size does not seem to affect the rate of internal pressure increase. To more closely examine this effect, FIG. 11, which is merely a portion of the plot of FIG. 10 plotted on an enlarged scale, is presented. It is seen in FIG. 11 that while there is a slight reduction in the rate of pressure increase as the particle size is increased, the effect is relatively minor. There are at least two reasons why the change in pyrotechnic particle size did not appear to affect the rate of nitrous oxide dissociation and the pressure rise rate in the test tank. Firstly, the particle sizes of both the fule and oxidant components of the pyrotechnic formulation were not varied through a wide range. Thus, although particle size would be expected to have a strong effect on the amount and rate of dissociation, it was perhaps not noticed in these tests given the limited amount of particle size variation. Secondly, effects of the pyrotechnic constituents of the initiator itself may have been such that they effectively concealed the combustion properties of the additional titanium cupric oxide pyrotechnic. This is often the case for relatively large loads of very high temperature and rapid burning pyrotechnics like zirconium potassium perchlorate (ZPP).

The results shown clearly demonstrate that the physical characteristics of the beat source used to induce dissociation of nitrous oxide-bearing mixtures can be used to modify the performance characteristics of these systems. As pyrotechnic or other fuel materials with different physical characteristics burn, heat is transferred to the nitrous oxide-bearing mixtures at different rates. Thus, the amount (or degree) of dissociation of the nitrous oxide is affected by the rate at which the gas is heated to dissociation temperature of nitrous oxide. Understanding this effect is important because important inflation parameters—like rate of pressure rise—can then be changed through physical modifications of the dissociation heat source.

As described above, the invention relates the physical characteristics of the heat source pyrotechnic material or formulation to either or both the rate at which the gas source material dissociates and the amount (i.e., extent) of such dissociation. Thus, the invention yields a method by which important inflator performance parameters such as rise rate can be tailored for specific inflatable restraint system installations while minimizing or avoiding apparatus hardware changes or alterations. As will be appreciated, through the alteration of the physical characteristics of the heat source pyrotechnic material or formulation, the same or similar inflator device hardware can be used with heat source pyrotechnic materials of particularly selected physical characteristics to provide inflator devices having particularly desired, and possibly distinct, performance parameters. The ability to use the same hardware to provide inflators having selected and varied performance parameters can dramatically simply one or more of the manufacture, production and supply of corresponding inflatable restraint system assemblies and components and thus, for example, reduce or minimize the costs associated therewith. In view of the above, significant benefits can be realized through the practice of the above-described invention.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for inflating an inflatable device, said apparatus comprising:
   a first chamber containing a fluid load having an equivalence ratio of less than 0.25 and including at least one gas source material which undergoes dissociation to form at least one gaseous dissociation product used to inflate the inflatable device; and
   a heat source including a load of fuel material and an initiator to initiate reaction of at least a portion of the fuel material load to produce heat, the heat source actuatable to be in heat transmitting communication with the contents of said first chamber to initiate dissociation of the at least one gas source material,
   wherein the fuel material is selected to provide, during the first 150 milliseconds after initiation of reaction thereof, at least about 95% of the total heat liberated by the reaction of the fuel material.

2. The apparatus of claim 1 wherein the fuel material comprises a pyrotechnic.

3. The apparatus of claim 1 wherein the load of fuel material provides a calorific content of about 75 to about 300 calories per gram of the fluid load.

4. The apparatus of claim 1 wherein the fuel material is selected to provide at least about 95% of the total heat liberated by the reaction of the fuel material prior to dissociation and release from said first chamber of associated dissociation product of more than about 90% of the gas source material originally contained within said first chamber.

5. The apparatus of claim 4 wherein the fuel material is additionally selected to provide a maximum rate of heat release prior to dissociation and release from said first chamber of associated dissociation product of more than about 75% of the gas source material originally contained within said first chamber.

6. The apparatus of claim 5 wherein the fuel material is additionally selected to provide a maximum rate of heat release prior to dissociation and release from said first chamber of associated dissociation product of more than about 50% of the gas source material originally contained within said first chamber.

7. The apparatus of claim 1 wherein the at least one gas source material is $N_2O$.

8. The apparatus of claim 1 wherein the fuel material has a geometry selected to provide, upon combustion thereof, a selected rate of dissociation of the gas source material.

9. The apparatus of claim 1 wherein the fuel material has a surface area selected to provide, upon combustion thereof, a selected rate of dissociation of the gas source material.

10. The apparatus of claim 1 wherein the fuel material is of a particle size selected to provide, upon combustion thereof, a selected rate of dissociation of the gas source material.

11. The apparatus of claim 1 wherein the fuel material is in the form of a pyrotechnic stored separately frorn the at least one gas source material.

12. A method of operating the apparatus of claim 4 comprising the steps of:
   actuating the initiator to initiate reaction of at least a portion of the load of fuel material to produce heat and
   transmitting at least a portion of the produced heat to the contents of said first chamber to initiate dissociation of the at least one gas source material.

13. An apparatus for inflating an inflatable device, said apparatus comprising:
   a first chamber containing a fluid load having an equivalence ratio of less than 0.25 and including at least one gas source material which undergoes dissociation to form at least one gaseous dissociation product used to inflate the inflatable device; and
   a heat source including a load of fuel material and an initiator to initiate reaction of at least a portion of the fuel material load to produce heat, the heat source actuatable to be in heat transmitting communication with the contents of said first chamber to initiate dissociation of the at least one gas source material,
   wherein the fuel material is selected to provide, during the first 100 milliseconds after initiation of reaction thereof, at least about 95% of the total heat liberated by the reaction of the fuel material.

14. The apparatus of claim 13 wherein the fuel material comprises a pyrotechnic.

15. The apparatus of claim 13 wherein the load of fuel material provides a calorific content of about 75 to about 300 calories per gram of the fluid load.

16. The apparatus of claim 13 wherein the fuel material is selected to provide at least about 95% of the total heat liberated by the reaction of the fuel material prior to dissociation and release from said first chamber of associated dissociation product of more than about 90% of the gas source material originally contained within said first chamber.

17. The apparatus of claim 16 wherein the pyrotechnic is additionally selected to provide a maximum rate of heat release prior to dissociation and release from said first chamber of associated dissociation product of more than about 75% of the gas source material originally contained within said first chamber.

18. The apparatus of claim 16 wherein the pyrotechnic is additionally selected to provide a maximum rate of heat release prior to dissociation and release from said first chamber of associated dissociation product of more than about 50% of the gas source material originally contained within said first chamber.

19. The apparatus of claim 13 wherein the at least one gas source material is $N_2O$.

20. The apparatus of claim 13 wherein the fuel material has a geometry selected to provide, upon combustion thereof, a selected rate of dissociation of the gas source material.

21. The apparatus of claim 13 wherein the fuel material has a surface area selected to provide, upon combustion thereof, a selected rate of dissociation of the gas source material.

22. The apparatus of claim 13 wherein the fuel material is of a particle size selected to provide, upon combustion thereof, a selected rate of dissociation of the gas source material.

23. The apparatus of claim 13 wherein the fuel material is in the form of a pyrotechnic stored separately from the at least one gas source material.

24. A method of operating the apparatus of claim 13 comprising the steps of:
   actuating the initiator to initiate reaction of at least a portion of the load of fuel material to produce heat and
   transmitting at least a portion of the produced heat to the contents of said first chamber to initiate dissociation of the at least one gas source material.

25. An apparatus for inflating an inflatable device, said apparatus comprising:
   a first chamber containing a fluid load including at least one gas source material which undergoes dissociation to form at least one gaseous dissociation product used to inflate the inflatable device; and
   a heat source including a load of fuel material and an initiator to initiate reaction of at least a portion of the fuel material load to produce heat, the heat source actuatable to be in heat transmitting communication with the contents of said first chamber to initiate dissociation of the at least one gas source material;
   wherein the fuel material comprises a pyrotechnic selected to provide at least about 95% of the total heat liberated by the reaction of the pyrotechnic prior to dissociation and release from said first chamber of associated dissociation product of more than about 50% of the gas source material originally contained within said first chamber and a maximum rate of heat release prior to dissociation and release from said first chamber of associated dissociation product of more than about 25% of the gas source material originally contained within said first chamber.

26. An apparatus for inflating an inflatable device, said apparatus comprising:
   a first chamber containing a fluid load having an equivalence ratio of less than 0.25 and including nitrous oxide; and
   a heat source including a load of pyrotechnic and an initiator to initiate reaction of at least a portion of the pyrotechnic load to produce heat, the heat source actuatable to be in heat transmitting communication with the contents of said first chamber to initiate dissociation of at least a portion of the nitrous oxide to form at least one gaseous dissociation product used to inflate the inflatable device;
   wherein the pyrotechnic is selected to provide at least about 95% of the total heat liberated by the reaction of the pyrotechnic prior to dissociation and release from said first chamber of associated dissociation product of more than about 90% of the gas source material originally contained within said first chamber and wherein the pyrotechnic load provides a calorific content of about 75 to about 300 calories per gram of the fluid load.

27. The apparatus of claim 26 wherein the pyrotechnic has a geometry selected to provide, upon combustion thereof, a selected rate of dissociation of the gas source material.

28. The apparatus of claim 27 wherein the pyrotechnic has a surface area selected to provide, upon combustion thereof, a selected rate of dissociation of the gas source material.

29. The apparatus of claim 27 wherein the pyrotechnic is of a particle size selected to provide, upon combustion thereof, a selected rate of dissociation of the gas source material.

30. An apparatus for inflating an inflatable device, said apparatus comprising:
   a first chamber containing a fluid load including nitrous oxide; and
   a heat source including a load of pyrotechnic and an initiator to initiate reaction of at least a portion of the pyrotechnic load to produce heat, the heat source actuatable to be in heat transmitting communication with the contents of said first chamber to initiate dissociation of at least a portion of the nitrous oxide to form at least one gaseous dissociation product used to inflate the inflatable device;
   wherein the pyrotechnic is selected to provide at least about 95% of the total heat liberated by the reaction of the pyrotechnic prior to dissociation and release from said first chamber of associated dissociation product of more than about 90% of the gas source material originally contained within said first chamber, wherein the pyrotechnic load provides a calorific content of about 7.5 to about 300 calories per gram of the fluid load and wherein a maximum rate of heat release occurs prior to dissociation and release from said first chamber of dissociation product corresponding to more than about 25% of the gas source material originally contained within said first chamber.

31. The apparatus of claim 30 wherein the pyrotechnic has a geometry selected to provide, upon combustion thereof, a selected rate of dissociation of the gas source material.

32. The apparatus of claim 31 wherein the pyrotechnic has a surface area selected to provide, upon combustion thereof, a selected rate of dissociation of the gas source material.

33. The apparatus of claim 31 wherein the pyrotechnic is of a particle size selected to provide, upon combustion thereof, a selected rate of dissociation of the gas source material.

34. A method of operating the apparatus of claim 25 comprising the steps of:
   actuating the initiator to initiate reaction of at least a portion of the load of fuel material to produce heat and
   transmitting at least a portion of the produced beat to the contents of said first chamber to initiate dissociation of the at least one gas source material.

* * * * *